United States Patent [19]

Gi et al.

[11] Patent Number: 4,745,280

[45] Date of Patent: May 17, 1988

[54] APPARATUS FOR MEASURING THE PROFILE OF A LASER BEAM

[75] Inventors: Kwon Y. Gi; Lee Y. In; Lee Y. Gi, all of Seoul, Rep. of Korea

[73] Assignee: Daewoo Heavy Industries, Ltd., Incheon, Rep. of Korea

[21] Appl. No.: 775,746

[22] Filed: Sep. 13, 1985

[30] Foreign Application Priority Data

Nov. 20, 1984 [KR] Rep. of Korea ............... 84-7248

[51] Int. Cl.$^4$ .................................. G01J 5/08
[52] U.S. Cl. .................................. 250/347; 250/338.1; 250/348
[58] Field of Search ............... 250/354.1, 347, 348, 250/338 R; 350/6.5

[56] References Cited

U.S. PATENT DOCUMENTS 4,230,393 10/1980 Burke, Jr. ..................... 350/6.5
4,469,945 9/1984 Hoeberechts et al. .............. 250/370

OTHER PUBLICATIONS

D. Wildmann, R. Brönnimann, and G. Schürch, "Low-Cost CO$_2$ Laser Beam Profile Monitor", *Rev. Sci. Instrum.*, vol. 55, No. 11 (Nov. 1984), pp. 1777-1778.
D. F. Grosjean, R. A. Olson, B. Sarka, Jr., and D. C. Rabe, "High-power CO$_2$ Laser-Beam Monitor", *Rev. Sci. Instrum.*, vol. 49, No. 6 (Jun. 1978), pp. 778-781.

*Primary Examiner*—Janice A. Howell
*Assistant Examiner*—Constantine Hannaher
*Attorney, Agent, or Firm*—Lackenbach Siegel Marzullo Presta & Aronson

[57] ABSTRACT

An apparatus for accurately measuring laser beam intensity profiles so as to permit adjusting the oscillation mode of the laser to achieve good workability of the beam. The beam from a CO$_2$ laser generator is attenuated and applied to an infrared sensor which produces an electrical analog signal representing the beam intensity. The sensed signal is amplified and applied via an A/D converter and an interface to a computer. The computer controls a scanner which scans successive scanning lines of the laser beam profile across the sensor. The computer also produces a visual image of the laser beam intensity profile from the sensor signal. An operator veiwing such image can make an accurate and convenient measurement of the laser beam intensity profile, thereby providing a basis for quantitative analysis in quality inspection of workpieces subjected to the laser beam.

4 Claims, 3 Drawing Sheets (a)

(b)

(c)

APPARATUS FOR MEASURING THE PROFILE OF A LASER BEAM

BACKGROUND OF THE INVENTION

1. Field of the Invention

This invention relates to an apparatus for accurately measuring the intensity profile of a laser beam in order to permit control of the oscillation mode of a high power laser, such as a $CO_2$ laser, so as to produce a laser beam of good workability for processing of workpieces subjected to the beam.

2. Description of the Related Art

Devices for measuring the intensity profile of a laser beam are known in the prior art. Such devices have projected the laser beam on a thick acrylic plate for a constant time period, resulting in a scribed pattern from which the beam profile can be conjectured in order to measure the profile of the beam. However, this is unsatisfactory for adjusting the laser oscillator to the optimum state of good workability, since a user must observe the scribed pattern with the eye and therefore only perceives the average value of the beam profiles, and thus can only perform a qualitative analysis.

In dealing with this problem, the present invention provides an accurate and convenient measurement of the intensity profiles of the laser beam, thereby allowing optimum adjustment of the laser oscillator and also providing a basis for quantitative analysis in quality inspection of workpieces subjected to the beam.

BRIEF DESCRIPTION OF THE DRAWINGS

The above objects and aspects of the present invention will become clear from the following description of a preferred embodiment of the invention with reference to the accompanying drawings, wherein.

DESCRIPTION OF THE PREFERRED EMBODIMENTS

Figure 1:
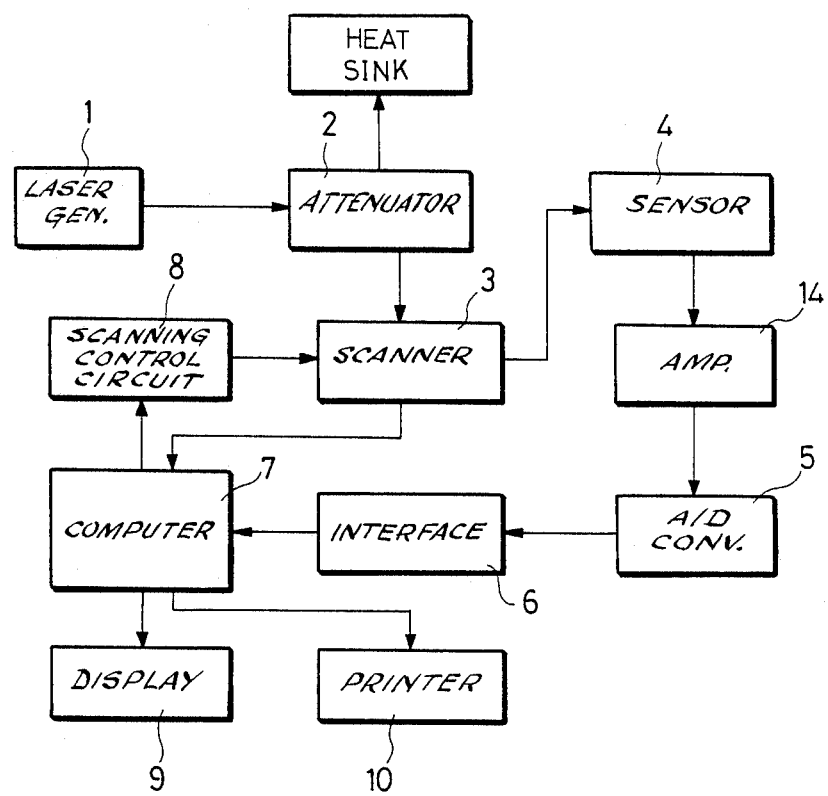
FIG. 1 is a schematic diagram showing the entire arrangement of the invention.

Referring now to FIG. 1, the laser beam output of a $CO_2$ laser generator (1) is input through an optical attenuator (2) to a scanner (3). The infrared scanning signal from scanner (3) is sensed by an infrared sensor (4) which produces a scanning signal which is then amplified by an amplifier (14) and thereafter is applied via an analog to digital (A/D) converter (5) and a computer interface circuit (6) to a computer system (7). A scanning control circuit (8) is connected with the computer system (7) and drives the scanner (3). The output of the computer system (7) actuates a graphic display (9) or a graphic printer (10).

Figure 3:
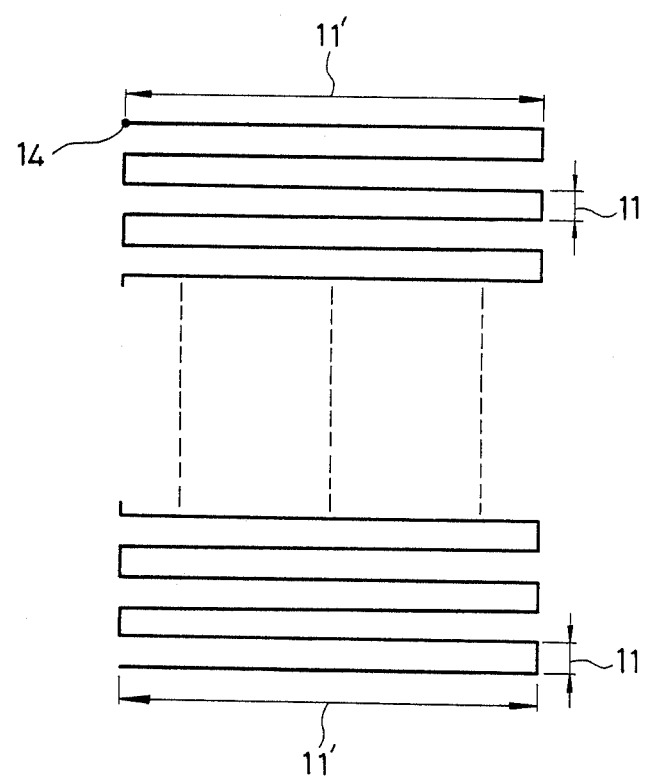
FIG. 3 represents an operational explanation of a scanner in accordance with the invention.

In FIG. 3, the reference numeral (11) or (11') denotes the distance moved by vertical and horizontal stepping motors in scanner (3), starting from an initial scanning point (14).

According to the present invention, the beam from $CO_2$ laser (1) is projected onto attenuator (2) after power has been supplied, and the attenuated beam arrives at a reflective lens (not shown) comprised in scanner (3). The computer (7) actuates the scanning control circuit (8) to drive the vertical and horizontal stepping motors (not shown) of scanner (3), whereby it performs a scanning operation as shown in FIG. 3. The infrared sensor (4) then detects the intensity profile of the laser beam along the successive scanning lines, receiving them sequentially. Therefore, the infrared sensor (4) generates an output signal which is an analog voltage proportional to the intensity of the beam along the successive scanning lines.

More specifically, under the control of computer (7) the scanning control circuit (8) causes the horizontal stepping motor in scanner (3) to horizontally rotate the reflective lens therein so that a horizontal line is scanned, whereby the scanner transmits a line of the scanned laser beam profile. Immediately thereafter, the scanning control circuit causes the vertical stepping motor to vertically reposition the reflective lens to the next scanning line, and then causes the horizontal stepping motor to rotate the lens again, whereby the scanner (3) continuously and repeatedly performs the procedure to transmit successive scanning lines of the laser beam profile. Infrared sensor (4) thereby generates an analog voltage signal representative of the entire intensity profile of the beam.

Since the sensor output signal is a low value of the order of microvolts, it is amplified to a sufficient level by amplifier (14) and then in A/D converter (5) is converted into a digital signal which, after processing by interface (6), can be accepted by computer (7). Thereafter, the digital signal is processed by computer (7) to depict the intensity profile of the laser beam on a graphic display (9) or a graphic printer (10) in accordance with a predetermined computer program.

Figure 2:
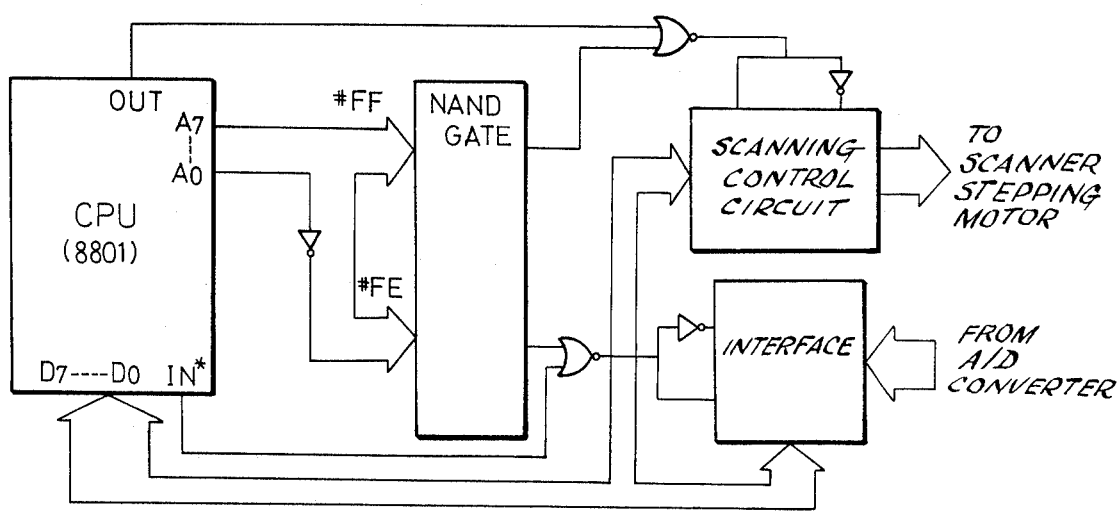
FIG. 2 diagrammatically illustrates a preferred embodiment of a scanner controller circuit in accordance with the invention.

Accordingly, the user can observe the displayed profiles and control the laser conveniently, thereby causing it to operate in the state which results in a beam profile of good workability. FIG. 2 shows an example of how a CPU and associated gates can control a system as described, and is not further described herein because such a CPU control arrangement is conventional.

Figure 4:
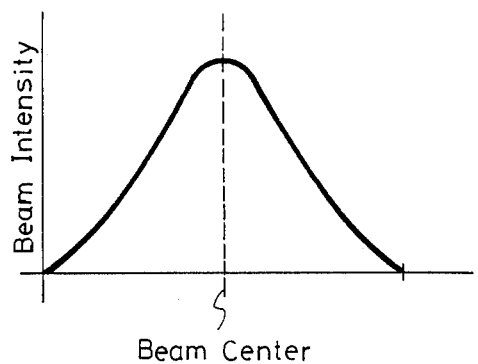
FIGS. 4(a) to (c) show various possible profile patterns of a $CO_2$ laser beam.
Figure 4:
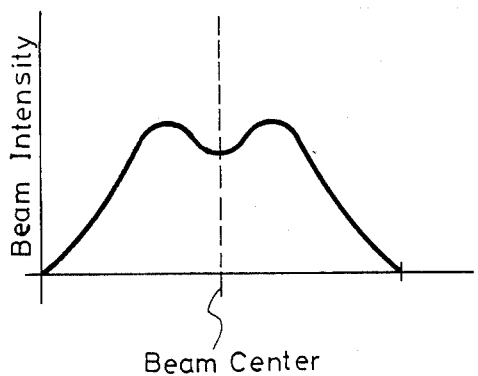
Figure 4:
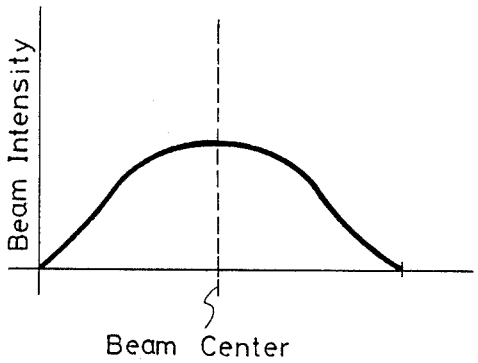

FIG. 4(a) shows the ideal beam intensity profile for working operation, while FIGS. 4(b) and 4(c) illustrate examples of undesirable beam profiles.

The present invention therefore allows the operator to measure the patterns of the beam intensity profile more rapidly, accurately and conveniently, as compared with the conventional method for projecting the beam on an acrylic plate, so that he can adjust the laser to the optimum state for efficient operation.

Moreover, the invention provides a basis for quantative analysis in quality inspection of workpieces and can be used for measuring the beam intensity profiles of a variety of laser utilizing devices.

What is claimed is:

1. Apparatus for measuring the intensity profile of a laser beam produced by a laser generator, comprising:
    means for attenuating the laser beam;
    scanning means which receives the attenuated laser beam and comprises optical reflecting means positioned by horizontal and vertical stepping motors which cause such optical reflecting means to successively scan across each of successive parallel scanning lines of a profile of said beam;
    a sensor which receives from said scanning means the successive scanning lines of the profile of said beam and produces an electrical signal which is an analog of the intensity of said beam along each of said successive scanning lines;

analog-to-digital converting means for converting said analog electrical signal to a digital signal corresponding thereto;

and computing means for receiving said digital signal and producing therefrom signals representing a visual image of the intensity profile of said beam.

2. Apparatus in accordance with claim 1, wherein said scanning means further comprises a scanning control circuit which operates under the control of said computing means to produce control signals for actuating said horizontal and vertical stepping motors.

3. Apparatus in accordance with claim 2, wherein said laser generator is a carbon dioxide laser oscillator and said sensor is responsive to the infrared spectral component of the laser beam.

4. Apparatus in accordance with either of claims 1 and 2 further comprising display means controlled by the signals produced by said computing means to produce a visual image of the intensity profile of said beam.

* * * * *